Figure 1:
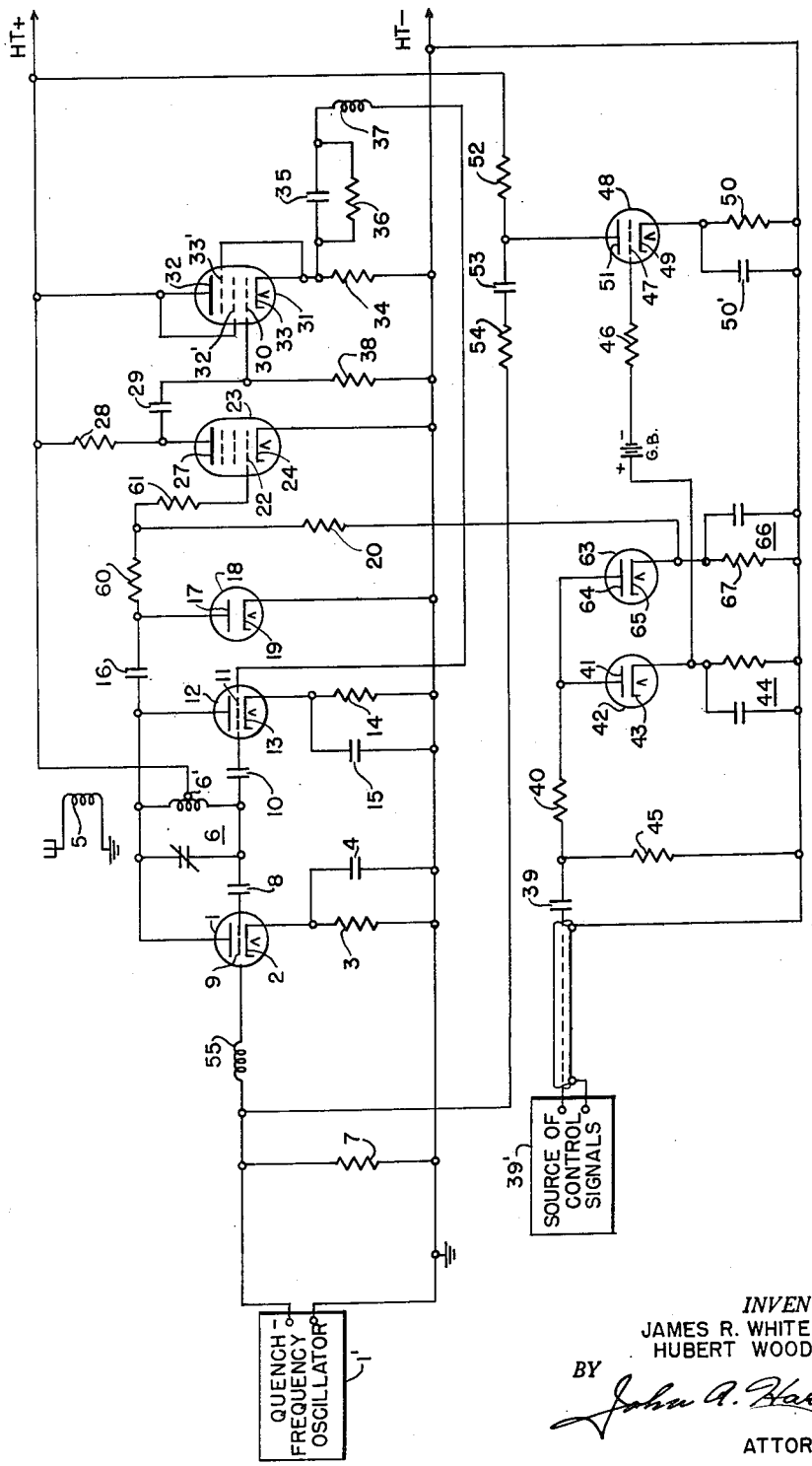

March 11, 1952 J. R. WHITEHEAD ET AL 2,588,444
WAVE SIGNAL RESPONDER SYSTEM
Filed Sept. 20, 1947 2 SHEETS—SHEET 1

*INVENTORS*
JAMES R. WHITEHEAD
HUBERT WOOD
BY
*John A. Harvey*
ATTORNEY

March 11, 1952   J. R. WHITEHEAD ET AL   2,588,444
WAVE SIGNAL RESPONDER SYSTEM
Filed Sept. 20, 1947   2 SHEETS—SHEET 2

INVENTORS
JAMES R. WHITEHEAD
HUBERT WOOD
BY
John P. Harvey
ATTORNEY

Patented Mar. 11, 1952

2,588,444

UNITED STATES PATENT OFFICE 2,588,444

WAVE SIGNAL RESPONDER SYSTEM

James Rennie Whitehead, Millbank, London, and Hubert Wood, Hollinwood, Lancashire, England, assignors to Ferranti Limited, Hollinwood, Lancashire, England, a corporation of Great Britain Application September 20, 1947, Serial No. 775,257
In Great Britain February 27, 1946

Section 1, Public Law 690, August 8, 1946
Patent expires February 27, 1966

12 Claims. (Cl. 250—15)

This invention relates to superregenerative wave-signal receivers associated with wave-signal transmitters to provide a system usually known as a wave-signal "responder" system. It is the purpose of a responder system to receive interrogating wave-signal pulses from a remote transmitting station, for example a ground radar station, to modify the wave form of such signal pulses in a manner predetermined in accordance with the nature or identity of the object in which the responder is transported, and then to transmit the modified signal pulses at the original or at a different carrier frequency as response signals, thereby providing to the remote station an indication of the nature or identity of the object. Such a receiver and transmitter system is herein referred to as being "a responder of the type stated." It is usually a characteristic of such a responder that its receiving frequency and, frequently also its transmitting frequency, is varied cyclically over a band of frequencies.

When a responder of the type stated is operated in proximity to radio detecting and ranging equipment, now known as radar equipment, employing a pulse-modulated exploring wave-signal radiated beam and usually a cathode-ray tube signal-display system, mutual interference may occur. For example it is sometimes necessary, for practical reasons, to operate the nearby radar equipment at a fixed frequency which is near to or coincides with the frequency or one of those frequencies at which the responder operates. In consequence the radar equipment picks up the response-signal output from the responder occurring at or near its own frequency. These response signals may seriously obscure the cathode-ray tube display scans in the radar equipment since such obscuring signals will not appear in the same position along each of the recurrent scans of the radar display owing to the recurrence frequency of the pulses transmitted from the responder being nonsynchronized with the recurrence frequency of the radar cathode-ray tube scans. Other obscuring signals may occur even if the responder is not responding to any remote station because of the radiation which is characteristic of its superregenerative receiving stage.

Furthermore, when the nearby radar equipment is operating, the pulse-modulated wave signal radiated therefrom may be of large amplitude and may trigger the nearby responder of the type stated. If triggering does occur a response wave-signal pulse is retransmitted from the responder and is picked up by the radar equipment where it appears at the beginning of the radar cathode-ray tube scans. Such spurious signals always occur at the same position along each recurrent scan and, as the duration of the responder wave-signal pulses may be appreciable when compared with the time taken to trace out each of the display scans, a large part of the radar display may be rendered useless. This form of interference may frequently occur even if the radar and responder equipments operate at different frequencies, owing to the lack of selectivity of the receiver circuits of the responder. An additional disadvantage of such triggering is the useless load imposed on the responder.

In the copending application of Maurice K. Taylor et al., entitled "Wave-Signal Responder System," Serial No. 766,393, filed August 5, 1947, and assigned to the same assignee as the present invention, an arrangement is described and claimed whereby a control voltage of negative polarity and of pulse wave form synchronized with the operation of a nearby radar equipment is applied to the control electrode of a superregenerative receiving valve in the responder system. In many cases, such a control voltage may be applied to the superregenerative valve without undue effect on the operation of that valve and serves to prevent the transmitter portion of the responder system from operating during the period of application of each control pulse. It is sometimes found, however, especially in the presence of very strong signals from the nearby radar equipment, that this method of suppression cannot conveniently be made to eliminate all interference of the responder system with the operation of the radar equipment.

It is an object of this invention, therefore, to provide a new and improved wave-signal responder system which substantially avoids one or more of the limitations and disadvantages of prior arrangements.

It is also an object of the invention to provide a new and improved wave-signal responder system of the type including a suppression arrangement in which suppression is obtained at least in part in circuits other than that of an amplifier valve.

It is a further object of the invention to provide a new and improved wave-signal responder system of the type including a suppression arrangement in which effective suppression of the responder function is obtained in the presence of very strong signals and with little interference with the responder operation when suppression thereof is not desired.

In accordance with the invention, a wave-signal responder system, adapted for use in association with a nearby pulse-modulated radar equipment, comprises receiver and transmitter means including a receiving valve for providing an amplified received signal and a detector device for detecting this amplified received signal. The responder system also includes an input circuit adapted to receive from the radar equipment a potential change occurring in timed relationship to and just prior to the instant of commencement of each period of operation of the radar equipment, and means for deriving from the potential change at least one control-voltage pulse having a wave form the duration of which embraces the operative period of the radar equipment. The responder system further includes means for applying control-voltage pulses derived by the last-mentioned means simultaneously not only to the receiving valve but also to the detector device so as to suppress the operation of the receiver and transmitter means of the responder system during each period of operation of the radar equipment, thereby to prevent interference with the radar equipment resulting from operation of the responder system.

Figure 3:
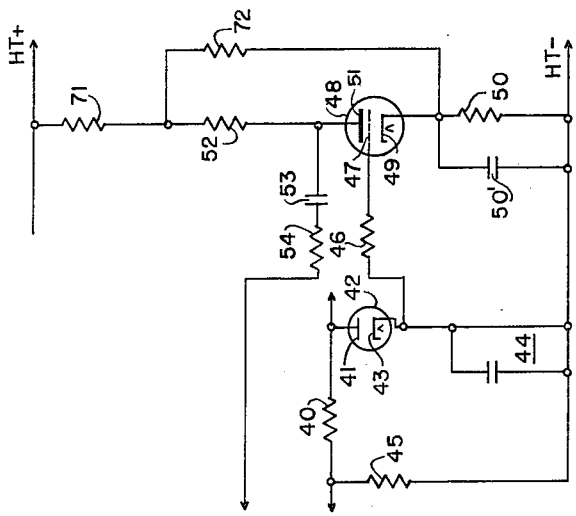
Figure 2:
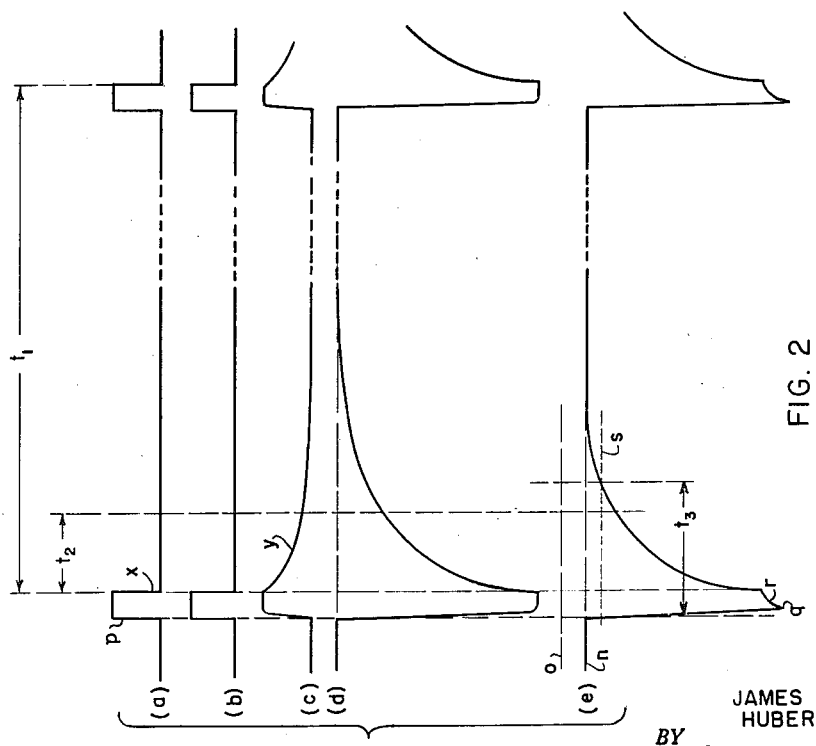

In order that the various features of the invention may be more readily understood, embodiments thereof will now be described by way of example with reference to the accompanying drawings, in which Fig. 1 is a circuit diagram of a responder of the type stated having interference suppression means according to one embodiment of the invention; Fig. 2 illustrates a number of voltage wave forms occurring at different points of the circuit arrangement of Fig. 1; and Fig. 3 shows a modification of the arangement shown in Fig. 1.

Referring now to Fig. 1, the responder circuit there shown includes a triode receiving valve 1 arranged to operate upon the superregenerative principle with the aid of a separate quench-frequency oscillator 1'. The receiving valve 1 is arranged to form part of a Hartley-type oscillator with one end of a tuned circuit 6 connected directly to its anode and the other end of the tuned circuit connected by way of coupling condenser 8 to its control electrode 9. The cathode 2 of valve 1 is connected to the earthed negative pole, designated HT—, of the high-tension supply by way of a biasing network consisting of resistance 3 and shunting decoupling condenser 4. The control electrode 9 also is connected to the negative high-tension supply by way of a radio-frequency choke 55 and a grid-leak resistance 7, whereby the potential drop across the biasing network 3, 4, so biases the control electrode 9, under normal operating conditions, that self-oscillation in the circuit of valve 1 takes place only in the region of the maximum positive amplitude of the quenching oscillation provided by the quench-frequency oscillator in the known superregenerative manner. The quench-frequency oscillator applies its output to the control grid 9 by way of radio-frequency choke 55.

While the present invention is applicable to responders of the type stated having separate tuned circuits for receiving and retransmitting at either similar or different frequencies, for convenience of illustration the tuned circuit 6 is shown as also forming the oscillatory circuit of a second Hartley-type oscillator comprising the triode valve 12, which constitutes the response-signal transmitting valve of the responder. The anode of valve 12 is connected directly to that end of tuned circuit 6 which is connected to the anode of valve 1, while the control electrode 11 of valve 12 is connected by way of coupling condenser 10 to the other end of tuned circuit 6 in similar manner to the control electrode 9 of valve 1. The midpoint 6' of the inductance of tuned circuit 6 is connected to the positive pole, designated HT+, of the high-tension supply so as to provide the requisite anode potential to both valves 1 and 12. Antenna means used for both reception and retransmission purposes is connected to coil 5, inductively coupled to the inductance of tuned circuit 6. The tuning condenser of the tuned circuit 6 may be arranged, if desired, to be varied cyclically over its capacity variation range, whereby the resonant frequency of the tuned circuit 6 and, hence, the effective reception and retransmission frequency, may be varied cyclically over a chosen band of frequencies.

The cathode 13 of valve 12 is also connected to the negative high-tension supply by way of a biasing network comprising resistance 14 shunted by decoupling condenser 15. The potential drop across this network is arranged, in a manner described more fully hereinbelow, to be of a value such that the control electrode 11 has, under normal nonresponding conditions, a negative bias potential of sufficient voltage to prevent the valve 12 from oscillating.

The anode side of tuned circuit 6 is connected by way of condenser 16 to the anode 17 of a diode detector valve 18 whose cathode 19 is directly connected to the earthed negative high-tension suppply. The load circuit of diode 18 includes a load resistance 20, the complete load circuit from anode 17 to earth including series-connected resistors 60, 20, and 61. The anode 17 of the detector diode valve 18 is connected to the control electrode 22 of a pentode amplifier valve 23 by way of the resistance 60 and a series resistance 61, while the valve 23 has its cathode 24 connected directly to the negative high-tension supply. The function of resistance 67 will be described hereinbelow. The anode 27 of pentode valve 23 is connected to the positive high-tension supply by way of a load resistor 28, while the screen and suppressor electrodes are provided with connections, not shown, in the normal manner customary for an amplifier valve.

Anode 27 further is connected by way of coupling condenser 29 to control electrode 30 of an additional pentode valve 31, the control electrode 30 being also connected to the negative high-tension supply by way of grid-leak resistance 38. Anode 32 and screen electrode 32' of this valve are strapped together and are connected directly to the positive high-tension supply. The suppressor electrode 33' of valve 31 is connected directly to the cathode 33, which is in turn connected to the negative high-tension supply by way of a load resistance 34, whereby this valve 31 operates in the manner of a cathode-follower stage.

The cathode 33 also is joined to one end of a parallel-connected resistance 36 and condenser 35, forming a pulse-widening or integrating circuit network, the other end of which is connected by way of a radio-frequency choke coil 37 to the control electrode 11 of transmitting valve 12. By virtue of the direct-current path afforded by choke coil 37 and resistance 36 the control electrode 11 will be seen to have a potential relative to its associated cathode 13 which is determined by the potential across the load resistance 34 and the opposing potential across the bias resistor 14. As already indicated, the value of the latter potential is arranged, under normal nonresponding conditions, to have a value exceeding that of the former by an amount sufficient to bias the transmitting valve 12 to a nonoscillating condition.

The arrangement so far described, which constitutes the receiver and transmitter means of a responder of the type stated and is of already known form, operates in the following manner. Incoming interrogation signal pulses are picked up by the antenna means associated with the coil 5, are applied to tuned circuit 6, and upon the tuning of the latter to resonance therewith are received superregeneratively by valve 1. The received and amplified signals are then applied to diode valve 18, where they are rectified to produce a rectified output signal across load resistance 20. This rectified signal, in the form of pulse signals of negative polarity at the anode end of resistance 20, is applied through resistor 61 to the pentode amplifier valve 23 to produce an amplified output pulse of positive polarity at the anode 27 of the latter valve. This pulse is then applied to the cathode-follower valve 31 to cause, in the usual known manner, the development of a similar output pulse of positive polarity across the cathode load resistor 34. Each of these pulses is applied, after passage through the network 35, 36 which causes the pulse time duration to be suitably extended or "widened," to the control electrode 11 of transmitting valve 12, where it increases the control-electrode potential to a positive value such that violent oscillation of the valve takes place. This results in the transmission of a response pulse-modulated wave signal from the antenna connected to coil 5. The duration of each pulse of this response signal is determined by a number of factors, among which are the time constants of the pulse-widening circuit 35, 36 and the biasing network 14, 15 of the transmitting valve 12. For successful operation these time constants and the time constant of the biasing network 3, 4 of the receiving valve 1 have to be of appropriate predetermined values chosen in accordance with principles well known in the art.

In addition to the conventional portions of the responder apparatus, operating as just described, it may be advantageous to include an arrangement for preventing the retransmission of signals from a responder of the type stated during the periods of operation of a nearby pulse-modulated radar equipment. In this way the responder is left free to operate in its normal way during only those intermediate periods lying between the end of one operative scan of the nearby radar display system and the commencement of the next following display scan. Although such intermediate periods may appear to be short, they are usually much greater than the related radar display scanning periods so that the responder is free to operate effectively, in a series of short periods, during the greater proportion of the total time during which both the responder and the nearby radar equipment are in use. As an example the radar equipment may radiate exploring pulses at the rate of 500 per second, each pulse being followed by an operative display scanning period of 200 microseconds. In association with such radar equipment the responder embodying the present invention would be free to operate normally for a maximum period of 1800 microseconds after each scanning period of the nearby radar equipment, i. e. a total of 500 × 1800 microseconds = 900 milliseconds in every second or $\tfrac{9}{10}$ths of the total time period of conjoint use.

For the purpose of preventing the retransmission of response signals in the manner described above during the operative periods of a nearby radar equipment, an input circuit is provided which is adapted to receive from a source of control signals 39', which in turn is coupled to timing circuits in the radar equipment (not shown), a suitable potential change occurring in timed relation to and just prior to the instant of commencement of each operative period of the radar equipment. While a potential change in the form of a voltage pulse of negative polarity may be utilized in equipment of the general type described herein, the equipment and its operation are described for convenience with reference to a controlling potential change of positive polarity. Thus, in one general form of radar equipment, with which the present illustrated embodiment of the invention is adapted to co-operate, each cathode-ray tube display scan is initiated by the trailing edge of a pulse of positive polarity and substantially rectangular wave form, such as that shown at diagram (a) of Fig. 2. This pulse, although short, is usually 5 to 20 times the duration of the response signal pulse used with the present responder, and use may be made of such a potential change of pulse wave form in the present embodiment of the invention for effecting the required suppression of the responder during the radar operation periods, the period of suppression commencing practically simultaneously with the leading edge of such pulse.

The apparatus provided comprises an input circuit which includes series-connected condenser 39 and resistor 45, the latter connected to earth. Associated with resistor 45 of this input circuit is a unilaterally conductive device in the form of a diode valve 42 whose anode 41 is connected by way of resistance 40 and condenser 39 to the terminal of source 39' remote from earth. The connection to source 39' conveniently may be made through a shielded concentric type cable whose outer shielding conductor is connected directly to the earthed negative high-tension supply. The cathode 43 of valve 42 is connected to the negative high-tension supply by way of load network 44 comprising a parallel-connected resistance and capacitance.

The cathode 43 is also connected by way of a direct-current path comprising a grid-bias battery, designated GB, and a resistance 46 to control electrode 47 of a triode valve 48, whose cathode 49 is connected to the negative high-tension supply by way of a biasing network comprising resistance 50 and shunting decoupling condenser 50'. Anode 51 of valve 48 is joined to the positive high-tension supply by way of load resistance 52.

The anode 51 of valve 48 also is connected to the control electrode 9 of receiving valve 1 by way of series-connected condenser 53, resistance 54, and the radio-frequency choke 55. The apparatus thus far described is essentially the same as the apparatus illustrated and described in Fig. 1 of the above-mentioned copending application of Maurice K. Taylor et al.

In the operation of this suppression apparatus, a signal having the wave form shown in diagram (a), Fig. 2, is received at the input circuit from the source 39' coupled to the nearby radar equipment. This wave form will be seen to comprise a series of potential changes in the form of a series of pulses $p$ of positive polarity and rectangular wave shape separated by time intervals $t_1$ determined by the pulse-recurrence frequency of the particular radar equipment. The trailing edge $x$ of each pulse $p$ conventionally is caused to initiate the commencement of an operative display scan of the radar cathode-ray tube, such scan lasting for the time period $t_2$ after each pulse. In practice $t_1$ is usually of the order of 1 to 5 milliseconds while $t_2$ is usually of the order of 200 to 600 microseconds according to the type of radar equipment.

The application of each pulse $p$ causes, as shown in diagram (b), Fig. 2, a steep rise in the potential of the anode 41 of diode valve 42 coincident with the leading edge of the pulse and a correspondingly steep fall at the trailing edge of the pulse. The resulting potentials of the cathode 43 of valve 42 are shown in diagram (c) of Fig. 2, from which it will be seen that there is a corresponding rise at the leading edge of the pulse. This potential rise, however, is rather less steep than that of the anode of tube 42 due to the effect of the series resistance of the diode valve in association with the capacitance of the network 44. Upon the termination of the input pulse, the diode becomes nonconductive and the capacitance of the network 44 is left to discharge at a rate determined by the time constant of the network. This time constant is made relatively long so as to provide a derived voltage pulse having an extended sloping trailing edge of exponential decay form as shown at $y$ in diagram (c). The decay time of this sloping trailing edge is arranged, as shown, to be somewhat in excess of the time period $t_2$ of diagram (a).

The term "sloping trailing edge" as used herein is intended to mean that the time taken for the last-mentioned derived voltage pulse to decay from its maximum to its minimum value upon the termination thereof is of appreciable finite value instead of the instantaneous change which occurs in an ideal form of square sided pulse. Such sloping trailing edge has the effect of suitably extending the effective period of the pulse. The amount of slope or decay time provided at the trailing edge is dependent upon the characteristics of the circuit or circuits to which it is applied and, is, of course, adjusted in practice to have an adequate but not excessive value since undue prolongation of the decay time will lessen unnecessarily the time period when the responder is effective to perform its normal function.

While the sloping trailing edge may be achieved in various ways, for example, by initiating the controlled charge or discharge of a condenser by means of a valve such as a pentode, conveniently such trailing edge is given an extended exponential form by the provision, in the pulse-deriving means, of a circuit network having a suitably long time constant. In order that only the trailing edge and not both leading and trailing edges of the voltage pulse may be given such exponential form, such circuit network is desirably associated with a unilaterally conductive device such as the diode valve 42.

The output pulse developed across the network 44 is applied over the direct-current path of battery GB and resistance 46 to the control electrode 47 of a valve 48. This valve is normally biased by the battery GB to anode-current cutoff, so that upon application of the pulse the anode potential falls rapidly, as shown in diagram (d) of Fig. 2, from a value substantially equal to that of the high-tension supply, then remains at a low value for the duration of the pulse and subsequently rises gradually, following the extended sloping trailing edge of the pulse of diagram (c). This output pulse, appearing at the anode 51 of valve 48, is applied to the control electrode 9 of valve 1.

The resultant control-electrode potential changes with respect to the cathode 2, and the suspension from normal operation of the valve 1 is illustrated by diagram (e) of Fig. 2. As already explained, the normal standing potential of control electrode 9 with respect to cathode 2 is negative by an amount suitable to proper superregenerative operation. This is indicated by the displacement of the standing potential level $n$ in diagram (e) below the cathode potential level $o$. Upon application of the negative pulse of diagram (d), the control electrode 9 is driven excessively negative to point $q$ coincident with the leading edge of the pulse $p$. This causes complete cutoff of anode current in valve 1, and the grid-to-cathode potential subsequently rises slightly as shown at $r$ in diagram (e) due to the exponential discharge of the biasing network 3, 4 which was originally contributing the standing potential $n$—$o$. This condition persists substantially until the end of the pulse $p$, whereupon the control-electrode potential rises gradually in conformity with the exponential form of the trailing edge of the pulse of diagram (d) until it attains the critical operating level $n$. By that time the rise of control-electrode voltage due to the potential change of the anode 51 is substantially offset by the increase in the opposing bias potential developed across the network 3, 4 due to resumed anode-current flow in the receiving valve 1. The cutoff level of the grid potential of valve 1 is indicated in diagram (e) by dotted line $s$, and it will be seen that valve 1 is hell completely cut off and hence inoperative for the period $t_3$, which includes and extends beyond the end of the operative period $t_2$ of the associated radar equipment. The nature and operation of the suppression circuits of valves 42 and 48 is substantially as described in the above-mentioned copending application of Maurice K. Taylor et al. While these circuits and the connection thereof to the control electrode 9 of valve 1 may be omitted, they are used, in addition to the suppression circuit about to be described, in a preferred embodiment of the invention particularly adapted for use when the exploring signals from the nearby radar equipment are expected to be of very high intensity.

The apparatus for preventing undesired retransmission during the operation of a nearby radar equipment comprises, in accordance with one embodiment of the present invention, a further diode valve 63 connected to a load network 66, both being associated with the resistor 45 of the input circuit as indicated in Fig. 1. The anode 64 of diode 63 is connected in parallel with the anode 41 of diode 42, while the cathode 65 of this valve is connected to the lower potential end of the load resistance 20, whereby the resistance 67 of the network 66 constitutes a part of the load resistance network for the detector valve 18. Each of the networks 44 and 66 are arranged to have suitably long although somewhat different time constants, as described hereinbelow.

In the operation of this suppression apparatus, the application of each pulse $p$ causes, as shown in diagram (b) of Fig. 2, a steep rise in the potential of the anode 64 of diode valve 63, coincident with the leading edge of the pulse, and a correspondingly steep fall at the trailing edge of the pulse, just as in the case of the diode valve 41. In the case of the diode valve 41, as explained earlier, the extended sloping trailing edge of the negative suppression pulse of diagram (d) gives the condenser 4 of the biasing network of the receiving valve 1 time to recharge upon resumption of anode-current flow through the valve and thus to reimpose the full negative automatic bias voltage normally provided thereby before the applied negative bias voltage due to the suppression pulse has been finally removed. The potentials at the cathode 65 of valve 63 resulting from the application of the pulse wave form of diagram (a) are substantially similar to those already described and shown by diagram (c), although the time constant of network 66 may be appreciably shorter than that of network 44 and the resultant decay time of the sloping trailing edge correspondingly less, because the additional suppression pulse obtained at the cathode 65 need not have a trailing edge long enough to permit recharging of a self-biasing network such as the resistor 3 and condenser 4. This additional suppression pulse is used to effect further suppression of the responder by application of the pulse to the anode 17 of diode detector valve 18 by way of resistances 20 and 60 and to the control grid 22 of valve 23 by way of resistances 20 and 61.

The application of such positive pulses to the diode anode 17 causes current to flow through this valve. This reduces the diode resistance, and, as at radio frequencies the diode is effectively in parallel with the tuned circuit 6, considerable damping of the oscillations in the tuned circuit 6 results. The corresponding application of this positive pulse voltage to the control electrode of the subsequent amplifier valve 23 causes control-electrode current to flow since this amplifier valve normally operates with almost zero control-electrode bias. Such control-electrode current flow considerably reduces the effective control electrode-to-cathode input impedance of valve 23 and causes any input signal that may be developed across the load resistance 20 to be attenuated at the control electrode 22 to an extent determined by the respective values of the voltage divider comprising resistances 60 and 61 and the control electrode-to-cathode resistance of valve 23. The applied positive pulse also tends to counteract any negative potential that may be developed across the diode load owing to the rectification of incoming signals, which may be considerable despite the damping of tuned circuit 6 already described.

It is necessary for valves 42 and 63 to be separate diodes because networks 44 and 66 should have somewhat different characteristics, thereby necessitating separate cathode circuits. The use of separate diodes and cathode circuits also avoids the difficulty which would arise due to undesirable interstage coupling between valves 1, 18, and 23 if only a single diode and its cathode circuit were to be used. The two diodes could, of course, be located in one envelope if desired.

The purpose of resistance 40, which is in series with the diode valves 42 and 63, to prevent the possible pick-up of response signals retransmitted from the responder of the type stated and rectification of such signals by the circuits of the diode valves, thereby to produce a positive potential at either of the cathodes 43 or 65 sufficient to cause unwanted suppression of operation of the responder.

The arrangement shown in Fig. 3 may be used instead of the grid-bias battery GB, to ensure that valve 48 becomes biased beyond anode-current cutoff after the cessation of the suppression pulse from the local radar equipment. In this alternative arrangement a second resistance 71 is connected between load resistance 52 and the positive pole of the high-tension supply. The common point of these resistances is then joined by way of another resistance 72 to the cathode 49 of valve 48. The values of resistances 50, 72, and 71 are such as to prevent grid 47 becoming positive with respect to cathode 49 until near the end of the positive swing developed across network 44 at the start of the period of operation of the local radar equipment. The operation of the suppression circuit of diode 63 is substantially unaffected by the modification of Fig. 3.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal responder system, adapted for use in association with a nearby pulse-modulated radar equipment, comprising: receiver and transmitter means including a receiving valve for providing an amplified received signal and a detector device for detecting said amplified received signal; an input circuit adapted to receive from said radar equipment a potential change occurring in timed relationship to and just prior to the instant of commencement of each period of operation of said radar equipment; means for deriving from said potential change at least one control-voltage pulse having a wave form the duration of which embraces the operative period of said radar equipment; and means for applying control-voltage pulses derived by said last-mentioned means simultaneously to said receiving valve and to said detector device to suppress the operation of said receiver and transmitter means of said responder system during each period of operation of said radar equipment, thereby to prevent interference therewith resulting from operation of said responder system.

2. A wave-signal responder system according to claim 1 in which said receiving valve is a super-regenerative receiving valve having a control electrode and said detector device is a detector valve having an anode electrode, and in which said means for applying control-voltage pulses applies said derived pulses with positive polarity to said anode electrode of said detector valve.

3. A wave-signal responder system according to claim 2 in which said means for applying control-voltage pulses applies said derived pulses with negative polarity to said control electrode of said superregenerative receiving valve.

4. A wave-signal responder system according to claim 2 in which said detector valve is a diode valve.

5. A wave-signal responder system according to claim 1 in which said receiver and transmitter means includes an amplifier valve coupled to an output circuit of said detector device, and in which said means for applying control-voltage pulses applies said pulses to said amplifier valve simultaneously with the application of said pulses to said receiving valve and detector device.

6. A wave-signal responder system according to claim 5 in which said amplifier valve has a control electrode and, said detector device is a detector valve having an anode electrode, and in which said means for applying control-voltage pulses applies control pulses of positive polarity to said control electrode of said amplifier valve and to said anode electrode of said detector valve.

7. A wave-signal responder system according to claim 6 in which said amplifier valve is so arranged that said application of said control pulses thereto causes control-electrode current to flow therein.

8. A wave-signal responder system according to claim 1 in which said receiver and transmitter means includes a frequency-selective circuit coupled to said detector device, and in which said detector device is so arranged that said application of control pulses thereto causes increased damping of said selective circuit.

9. A wave-signal responder system according to claim 1 in which said means for deriving a control pulse comprises a circuit network having a relatively long time constant for deriving a control-voltage pulse having a trailing edge the amplitude of which varies exponentially with time.

10. A wave-signal responder system according to claim 9 in which said circuit network is associated with a unilaterally conductive device so arranged that only said trailing edge of said control-voltage pulse has an amplitude which varies exponentially with time.

11. A wave-signal responder system according to claim 10 in which said unilaterally conductive device includes a diode valve in series with said circuit network.

12. A wave-signal responder system, adapted for use in association with a nearby pulse-modulated radar equipment including cathode-ray tube display means having a predetermined cyclically recurring scanning period, comprising: receiver and transmitter means including a receiving valve for providing an amplified received signal and a detector valve for detecting said amplified received signal; an input circuit adapted to receive from said radar equipment a potential change occurring in timed relationship to and just prior to the instant of commencement of each of said scanning periods; at least one means for deriving voltage pulses the wave form of which has a sloping trailing edge responsive to said potential change; and means for applying control-voltage pulses derived by said last-mentioned means simultaneously to said receiving valve and to said detector valve to effect suppression of said receiver and transmitter means of said responder system and prevent the transmission of response signals by said receiver and transmitter means during each of said scanning periods.

JAMES RENNIE WHITEHEAD.
HUBERT WOOD.

REFERENCES CITED

The following references are of record in the file of this patent:

UNITED STATES PATENTS

| Number | Name | Date |
| --- | --- | --- |
| 2,414,992 | Wheeler | Jan. 28, 1947 |
| 2,415,667 | Wheeler | Feb. 11, 1947 |
| 2,425,600 | Coykendall | Aug. 12, 1947 |
| 2,429,513 | Hansen et al. | Oct. 21, 1947 |
| 2,460,202 | Tyson | Jan. 25, 1949 |

FOREIGN PATENTS

| Number | Country | Date |
| --- | --- | --- |
| 585,347 | Great Britain | Feb. 5, 1947 |
| 585,353 | Great Britain | Feb. 5, 1947 |